INVENTOR.
DOUGLAS G. ANDERSON

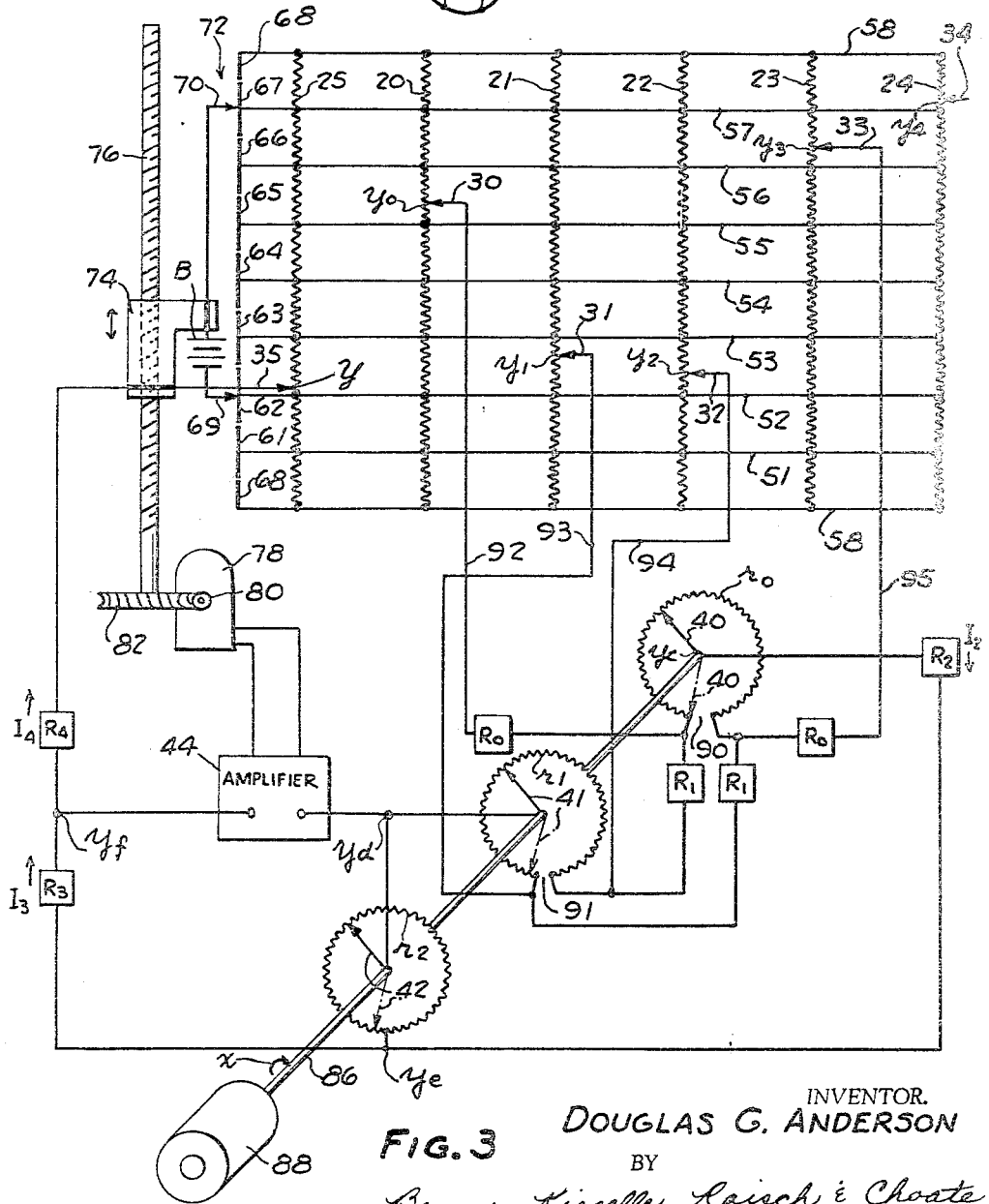

INVENTOR.
DOUGLAS G. ANDERSON
BY
Barnes, Kisselle, Raisch & Choate
ATTORNEYS

United States Patent Office 3,311,742
Patented Mar. 28, 1967

3,311,742
APPARATUS FOR GENERATING A FUNCTION
BY CUBIC INTERPOLATION
Douglas G. Anderson, 906 W. Oakridge,
Ferndale, Mich. 48220
Filed Jan. 15, 1963, Ser. No. 251,617
24 Claims. (Cl. 235—197)

This invention relates to an analog computer or function generator.

In many phases of modern technology, there is a need for accurate curve generators or computers. Some of these needs are satisfied by the electronic digital computers now being built by several large concerns. These computers are extremely fast and highly accurate. However, they are also very complex, expensive, and bulky and must be programmed by relatively highly trained personnel. Consequently, they are beyond the reach of large numbers of technical people and are generally unsuited to use where any appreciable degree of portability is necessary.

Attempts have been made to provide simpler, less expensive curve generators, but they have not been entirely satisfactory from the standpoint of accuracy, expense, simplicity of operation, or portability. The latter computers usually employ parabolic interpolation, and the first and second derivatives of the functions which they generate are in general discontinuous. Thus, these computers are deficient when, for example, the curve being generated is to be used in imparting velocities or accelerations.

The object of this invention is to provide a small, simple, inexpensive, light-weight computer which can be operated by relatively untrained personnel and which utilizes a method of generating a function which gives highly accurate results.

Generally, the invention contemplates an apparatus having components correlated to operate in accordance with one of several cubic equations. When a series of four values on a desired ideal curve are fed into the apparatus, it generates a segment of a cubic between the two middle values. This segment very closely approximates the corresponding portion of the ideal curve. Successive series of four values are fed into the apparatus, and it cyclically generates and adjoins successive cubic segments until the entire ideal function is approximated very accurately. Certain factors in the apparatus can be selectively varied to insure continuity of the first and/or second derivatives of the function being generated.

Generally speaking, the invention is applicable to any system involving either a single function or two or more simultaneous functions of one independent variable representing a quantity such as distance, angle, or time. For example, a single system could include two function generators controlled by the same independent variable to generate a three dimensional function in space. However, for the purpose of simplicity of illustration, the following disclosure will consider only one of the several possible functions of the independent variable.

The illustrated form of the invention utilizes an electrical resistance network in which the various voltages and resistances provide analogs of terms contained in the cubic equation. The network provides a signal in the form of a voltage which, when amplified, can be used to control any desired instrumentality such as a writing instrument, a cutting tool, an oscilloscope, a tracking device, navigation equipment, etc. In the drawings:

FIG. 1 shows a typical curve which can be generated by use of the present invention.

FIG. 3 is a diagrammatic representation of apparatus capable of one cycle of curve generation in accordance with this invention.

*Mathematical proof*

In the following discussion, it will be demonstrated that a desired theoretical or ideal curve can be approximated to a high degree of accuracy by adjoining segments of a succession of cubic curves defined in terms of successive groups of four points known to lie on the desired or theoretical curve. In each case, the cubic curve will satisfy the Generic Equation $$y = y_d - stK(y_c - y_d)$$

It will also be demonstrated that in the actual apparatus the physical components provide analogs of terms used in the equation. By this means, it will be shown that the apparatus does in fact perform in accordance with the equation and thus generates a highly accurate approximation of the ideal curve or function.

A graph represents a relation between physical quantities by lengths. The physical quantities themselves may represent such various things as distance, temperature, weight, time, voltage, etc. If a relation between two physical quantities is represented by a graph, the lengths in the graph and the actual physical quantities which they represent are analogs of one another. If a second relation between two other physical quantities can be represented by the same graph with no more than a change in the scales of the coordinates, each coordinate in the graph and the two physical quantities which it represents are analogs of one another.

Figure 2A:
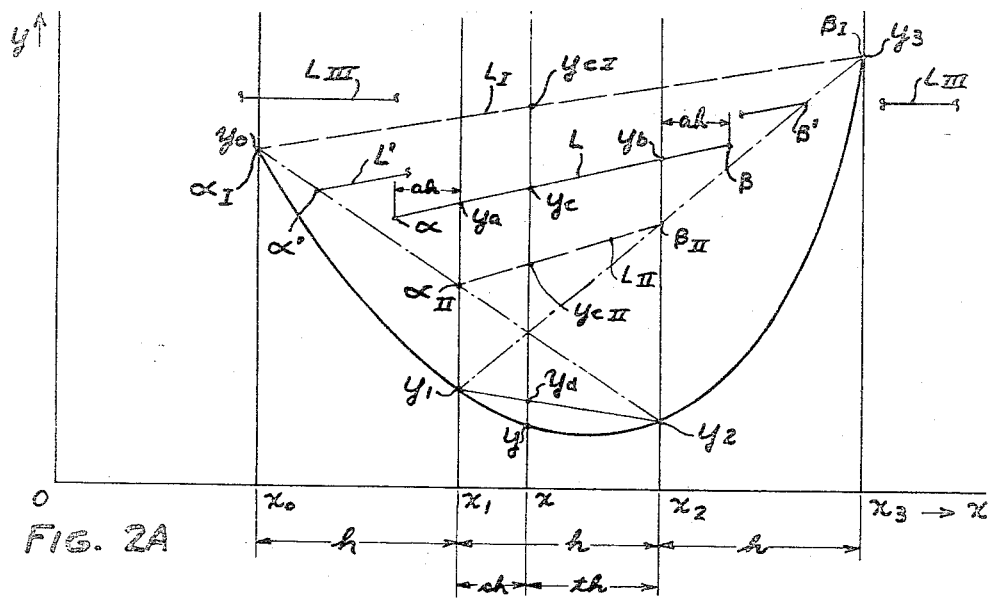
FIG. 2A is a partly diagrammatic representation of a cubic interpolative curve and illustrating numerous terms used in the cubic equation and in the mathematical demonstration of its validity.

Shown in FIG. 2A is a curve which represents a portion of a cubic curve to be approximated. This portion of the curve passes through four points whose $x$ values are $x_0$, $x_1$, $x_2$, and $x_3$ and whose corresponding $y$ values are $y_0$, $y_1$, $y_2$, and $y_3$. The above generic equation utilizes the values of the coordinates of these four points to generate the segment of the curve extending from $x_1y_1$ to $x_2y_2$. The interval between the $x$ values is uniform, namely $h$; $sh$ is defined as the difference in value between $x_1$ and $x$ for any point lying on the curve between $x_1$ and $x_2$. Similarly, $th$ is defined as the difference in value between that intermediate point and $x_2$. In passing from $x_1y_1$ to $x_2y_2$, $s$ will vary from zero to one and $t$ will vary from one to zero. The values of $x$, $y$, $sh$, and $th$ at such an intermediate point are represented graphically in FIG. 2A.

Figure 2B:
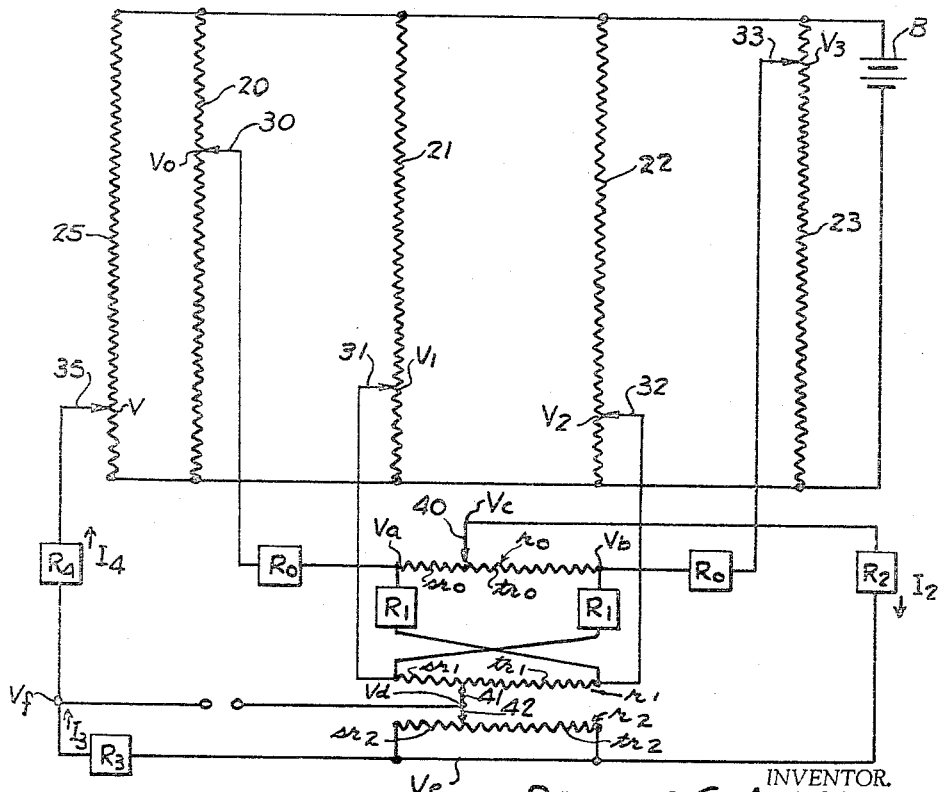
FIG. 2B is a diagrammatic representation of basic circuitry according to this invention.

Shown in FIG. 2B is an electrical resistance network which includes five resistances 20, 21, 22, 23, and 25 connected in parallel and furnished current from a suitable source such as battery B. A movable contact is provided for each of these resistances, these contacts being represented at 30, 31, 32, 33, and 35. (Reference numerals 24 and 34 are reserved for use in FIGS. 3 and 4 to maintain correspondence with the subscripted values of $x$ and $y$.) The network includes three resistors $r_0$, $r_1$, and $r_2$ provided respectively with movable contacts 40, 41, and 42.

Contacts 40–42 are arranged to move together so that in each case the fractional part of the resistor lying to the left of its contact is $s$ while the fractional part lying to the right of its contact is $t$. Consequently, the part of the resistance lying on the left of the movable contact is $sr_0$, $sr_1$, or $sr_2$ while the part of the resistance on the right side of the movable contact is $tr_0$, $tr_1$, or $tr_2$. In each case, $s$ will vary between zero and one in pasing from one end of the resistance to the other and $t$ will vary from one to zero. Thus, the position of each movable contact 40, 41, 42 and the resulting resistances are analogs of the $x$ value at a point between $x_1$ and $x_2$ in FIG. 2A.

In FIG. 2B, fixed resistances are shown at $R_0$, $R_1$, $R_2$, $R_3$, and $R_4$. $V_a$ and $V_b$ represent voltages at opposite ends of resistance $r_0$. $V_c$ represents the voltage at tap 40. $V_e$ represents a voltage at the ends of $r_2$. $V_d$ represents a voltage between taps 41 and 42, and $V_f$ represents a voltage between $R_3$ and $R_4$.

It is assumed that the resistance across each resistor 20–23 and 25, as well as each resistor $r_0$, $r_1$, and $r_2$ is uniformly distributed along its length. Consequently, contacts 30–33 can be set at points on their respective resistors at which voltages $V_0$, $V_1$, $V_2$, and $V_3$ will exist. These voltages are chosen so that their differences are analogs of the differences between $y_0$, $y_1$, $y_2$, and $y_3$. The differences between the voltages are significant rather than their absolute values since the location of zero is immaterial.

It is assumed that the resistances of resistors 20–23 and 25 are so low compared to the other resistances of the circuit that the currents through their respective movable contacts are negligible. Under this condition, the positions of the movable contacts are analogs of their voltages. It is assumed that contact 35 is moved as required to maintain equality between $V_f$ and $V_d$. It will be demonstrated that voltage V and thus the position of contact 35 is an analog of $y$ when the other resistances of the circuit have suitable values.

(It is suggested that those readers not particularly concerned with the mathematical demonstration of validity of the invention omit the following material and résumé at the section on "Apparatus.")

Referring to FIG. 2B, the current $I_3$ through resistance $R_3$ and the current $I_4$ through resistance $R_4$ are obviously equal:

$$I_3 = I_4 = \frac{V_e - V_f}{R_3} = \frac{V_f - V}{R_4}$$

Therefore $$V = V_f - \frac{R_4}{R_3}(V_e - V_f)$$

and Equation 1

$$V = V_d - \frac{R_4}{R_3}(V_e - V_d)$$

The following material is presented to show how the Generic Equation set forth above is derived from Equation 1 and to demonstrate the validity of the Generic Equation.

It is assumed that $R_2$ is very large with respect to $r_0$ and $r_1$. Under this condition, Equation 2a $$V_d = sV_2 + tV_1$$

Also, Equation 2b $$V_c = \frac{(R_1V_0 + R_0V_2)(t+a) + (R_1V_3 + R_0V_1)(s+a)}{(R_0+R_1)(1+2a)}$$

where $$a = \frac{R_1 R_0}{(R_1 + R_0) r_0}$$

As mentioned above, it is assumed that contact 35 is moved as required to maintain equality between $V_f$ and $V_d$. Thus, the current $I_2$ through $R_2$ will flow through $sr_2$, $tr_2$, and $R_3$ in parallel. The parallel resistance of these resistors is $$R_{II} = \frac{str_2 R_3}{str_2 + R_3}$$

The total resistance to $I_2$ between $V_c$ and $V_d$ is $R_2 + R_{II}$, while the resistance between $V_e$ and $V_d$ is $R_{II}$. Therefore $$V_c - V_d = \frac{R_{II}}{R_2 + R_{II}}(V_c - V_d)$$

Denoting $$\frac{R_3}{str_2 + R_3}$$

as M, this may be written as Equation 2c $$V_e - V_d = \frac{str_2 M}{R_2 + str_2 M}(V_c - V_d)$$

When $R_3$ is very large relative to $r_2$, M is very nearly one. When $R_2$ is also very large relative to $r_2$, the previous equation is, very nearly, Equation 2d $$V_e - V_d = \frac{str_2}{R_2}(V_c - V_d)$$

It will be shown later that the term $(V_c - V_d)$ is small. Therefore, the error introduced by this approximation can be neglected.

By substituting the foregoing value for $V_e - V_d$ in Equation 1, it becomes $$V = V_d - st\frac{R_4 r_2}{R_3 R_2}(V_c - V_d)$$

Denoting the constant $R_4 r_2 / R_3 R_2$ by K, Equation 1 becomes Equation 3

$$V = V_d - stK(V_c - V_d)$$

which corresponds exactly with the Generic cubic equation, with $y$'s replaced by $V$'s. Therefore, voltage V and the position of contact 35 are analogs of $y$.

The next few paragraphs will clarify the nature of certain terms in the Generic Equation and will lay a word basis for certain language used in the claims.

FIG. 2A includes a graphic illustration of quantities appearing in Equation 3 and the Generic Equation. From Equation 2a above, $V_d = sV_2 + tV_1$ which is analagous to $y_d = sy_2 + ty_1$, a linear function of $x$ whose graph is the straight line between $x_1 y_1$ and $x_2 y_2$. Thus, $y_d$ can be termed the linear interpolative value of $y$ between the points $x_1 y_1$ and $x_2 y_2$ at $x$. It will now be shown that $y_c$ is also a linear interpolative value of $y$ at $x$ but on a line L.

Replacing the V's by their analagous $y$'s, Equation 2b can be written as Equation 4:

$$y_c = \frac{R_1 y_0 + R_0 y_2}{R_0 + R_1} \cdot \frac{t+a}{1+2a}$$

$$+ \frac{R_1 y_3 + R_0 y_1}{R_0 + R_1} \cdot \frac{s+a}{1+2a}$$

Let $y_\alpha$ be the $y$ value of the point on the line from $x_0 y_0$ to $x_2 y_2$ which divides the line into segments whose ratio, measuring from $x_0 y_0$, is that of $R_0$ to $R_1$. Then $$y_\alpha = \frac{R_1 y_0 + R_0 y_2}{R_0 + R_1}$$

Similarly, let $y_\beta$ be the $y$ value of the point on the line from $x_3 y_3$ to $x_1 y_1$ which divides this line into segments whose ratio, measuring from $x_3 y_3$, is that of $R_0$ to $R_1$. Then $$y_\beta = \frac{R_1 y_3 + R_0 y_1}{R_0 + R_1}$$

Now Equation 2b can be more briefly written as $$y_c = y_\alpha \frac{t+a}{1+2a} + y_\beta \frac{s+a}{1+2a}$$

Let $x_\alpha$ and $x_\beta$ be defined by the equations $$x_\alpha = x_1 - ah \quad \text{and} \quad x_\beta = x_2 + ah$$

Then $$x_\beta - x_\alpha = x_2 - x_1 + 2ah = (1+2a)h$$

$$x - x_\alpha = x - (x_1 - ah) = (s+a)h$$

and $$x_\beta - x = x_2 + ah - x = (t+a)h$$

In FIG. 2A, $y_c$ is shown as the $y$ value of a point $x$, $y_c$ lying on a line L between the points $x_\alpha y_\alpha$ and $x_\beta y_\beta$, designated for convenience simply as $\alpha$ and $\beta$. It will be seen that $$\frac{s+a}{1+2a}$$

is the fraction of this line to the left of the point $xy_c$, and $$\frac{t+a}{1+2a}$$

is the fraction to the right. Therefore, $y_c$ is the linear interpolative value of $y$ at $x$ on line L.

It will be noted that the values of $x_\alpha$ and $x_\beta$ (at the end points of line L) differ equally but with opposite sign from the value of $x$ midway between $x_1$ and $x_2$; and that the value of $y_\alpha$ depends on the value of $y_0$ in the same way that the value of $y_\beta$ depends on the value of $y_3$. Thus, the value of $y_c$ is symmetrically dependent on the values of $y_0$ and $y_3$.

In the following material, certain species equations are developed and their properties are discussed with respect to practical application.

The specific form of the Generic Equation (i.e., species) depends on K and $y_c$. Selection of the best form depends upon the function to be approximated. To facilitate discussion of various forms of the equation, the following table is presented:

| x | y | D | $D^2$ | $D^3$ | $D^4$ |
|---|---|---|---|---|---|
| $x_0$ | $y_0$ | | | | |
| | | $D_0 = y_1 - y_0$ | | | |
| $x_1$ | $y_1$ | | $D_0^2 = D_1 - D_0$ | | |
| | | $D_0 = y_2 - y_1$ | | $D_0^3 = D_1^3 - D_0^3$ | |
| $x_2$ | $y_2$ | | $D_1^2 = D_2 - D_1$ | | $D_0^4 = D_1^3 - D_0^3$ |
| | | $D_2 = y_3 - y_2$ | | $D_1^3 = D_2^2 - D_1^2$ | |
| $x_3$ | $y_3$ | | $D_2^2 = D_3 - D_2$ | | |
| | | $D_3 = y_4 - y_3$ | | | |
| $x_4$ | $y_4$ | | | | |

In this table $D_1^2$, for example, is read "second difference, sub-one," etc.

If it is desired that the function to be generated have a second derivative which is everywhere continuous and if the fourth difference of the known values of $y$ is always very small, as is the case in many functions, then the best form of the equation probably is Species I:

$$y_I = sy_2 + ty_1 - \frac{st}{2}\left[\frac{(1+s)}{3}D_1^2 + \frac{(1+t)}{3}D_0^2\right]$$

or $$y_I = sy_2 + ty_1 - \frac{st}{2}\left[\frac{1+s}{3}y_3 + \frac{1+t}{3}y_0 - (sy_2 + ty_1)\right]$$

which defines $y$ when $x$ is between $x_1$ and $x_2$ inclusive. The constants are selected so that $K=\frac{1}{2}$, $R_1$ is infinite, and $R_0 = r_0$. Under these conditions, wherein $y \equiv y_I$, points $\alpha$ and $\beta$ are coincident with $x_0 y_0$ and $x_3 y_3$ respectively and the interpolation to obtain $y_{cI}$ is taken on line $L_I$.

In the course of generating (or approximating) a curve such as that represented in FIG. 1, after a segment has been generated between $x_1 y_1$ and $x_2 y_2$, another set of values of $y$ is selected, namely $x_1 y_1$, $x_2 y_2$, $x_3 y_3$, and $x_4 y_4$, for generating another contiguous segment between $x_2 y_2$ and $x_3 y_3$. In this range, $y_I$ is defined by increasing each subscript by 1. Additional segments are generated by a like process, the subscripts being increased by one for each new segment, until the desired curve has been completed.

The curve $y_I$, composed of a series of such segments, is continuous, and its second derivative is also continuous. Its first derivative is in general not continuous, but the discontinuity at $x_2$ can be shown to have the very small magnitude $$\frac{1}{6h}D_0^4$$

generally, the discontinuity at $x_n$ is $$\frac{1}{6h}D_{n-2}^4$$

In some applications, it may be desirable that the first derivative of the curve to be generated be continuous even though the fourth difference is not negligibly small. Then a better form of the equation is species II:

$$y_{II} = sy_2 + ty_1 - st\left(\frac{sD_1^2}{2} + \frac{tD_0^2}{2}\right)$$

$$= sy_2 + ty_1 - st\left[s\frac{y_1+y_3}{2} + t\frac{y_0+y_2}{2} - (sy_2+ty_1)\right]$$

which defines $y$ when $x$ is between $x_1$ and $x_2$, inclusive. The constants are selected so that $K=1$ and $R_0=R_1$. Under these conditions, wherein $y \equiv y_{II}$, the points $\alpha$ and $\beta$ lie on the midpoints of the lines $x_0 y_0$ to $x_2 y_2$ and $x_1 y_1$ to $x_3 y_3$ respectively, these points being denoted in FIG. 2A as $\alpha_{II}$ and $\beta_{II}$. The interpolation to obtain $y_{cII}$ is taken over one interval of $x$ on line $L_{II}$.

The desired curve is approximated by utilizing the Species II form of the equation in the manner described above for the Species I form. The curve formed by the resulting series of joined segments is smooth. That is, it and its first derivative are both everywhere continuous.

The second derivative has a discontinuity which at $x_2$ can be shown to have the magnitude $$\frac{D_1^3 + D_0^3}{h^2}$$

Generally, the discontinuity at any segment juncture is similarly expressed with the third differences appropriately subscripted.

The difference between $y_I$ and $y_{II}$ in general can be shown to be $$y_I - y_{II} = \frac{st(s-t)D_0^3}{6}$$

This difference can be shown to be greatest at $$s = \frac{3 \pm \sqrt{3}}{6}$$

where it is $$\pm \frac{\sqrt{3}}{108} D_0^3 = \pm .016 D_0^3$$

Where the third difference vanishes, $y_I \equiv y_{II}$; and if the third difference is never large, which is true in many cases, the greatest difference between $y_I$ and $y_{II}$ is negligible.

A characteristic of functions suitable for approximation by interpolation methods is that their differences of high order are negligibly small. The material thus far presented demonstrates that either Species I or Species II is suitable for approximation of such functions. It will now be determined to what extent more general forms of the Generic Equation are suitable for this purpose.

One such more general form may be expressed as the Subgeneric Equation $$y' = y_d - stK'(y_c' - y_d)$$

wherein certain restrictions are imposed on $K'$ and $y_c'$. $y_c'$ is defined as the linear interpolative value of $y$ at $x$ on a line $L'$ between two points $\alpha'$ and $\beta'$ (FIG. 2A). These points are on lines $x_0y_0$ to $x_2y_2$ and $x_3y_3$ to $x_1y_1$ respectively and they divide these lines in the same ratio, measuring respectively from $x_0y_0$ and $x_3y_3$. For convenience, the ratio is denoted $R_0/R_1$ and it is not greater than one.

The condition that $\alpha'$ and $\beta'$ shall lie on the lines $x_0y_0$ to $x_2y_2$ and $x_3y_3$ to $x_1y_1$ respectively will be fulfilled when $$r_0 = \frac{R_0 R_1}{R_1 - R_0}$$

It was shown above that to fulfill the Generic Equation, $$K = \frac{R_4 r_2}{R_3 R_2}$$

The additional restriction necessary to fulfill the Subgeneric Equation is that $$K' = \frac{R_1 + R_0}{2R_1} = \tfrac{1}{2}\left(1 + \frac{R_0}{R_1}\right)$$

Since in Species I $R_0/R_1 = 0$ and $K = \tfrac{1}{2}$ and in Species II $R_0/R_1 = 1$ and $K = 1$, it is seen that Species I and Species II are the limiting cases of all curves satisfying this Subgeneric Equation. Any other curve fitting this equation will lie between curves I and II and therefore will be a suitable form of the Generic Equation.

It will now be demonstrated that a small percentage variation in the value of K will usually have a negligible effect on the curve generated.

The limiting cases of the Subgeneric form are $$y_I = y_d - \frac{st}{2}\left[\frac{1+s}{3}D_1^2 + \frac{1+t}{3}D_0^2\right]$$

and $$y_{II} = y_d - st\left[\frac{s}{2}D_1^2 + \frac{t}{2}D_0^2\right]$$

The second term on the right side of each of these equations has a magnitude between $\tfrac{1}{2}stD_0^2$ and $\tfrac{1}{2}stD_1^2$. Thus, this term is small whenever the second differences are small. Any other species which might serve as a satisfactory substitute for Species I or II must have a corresponding term, differing in magnitude very little from that of either Species I or II. But this term of the Generic Equation is $stK(y_c - y_d)$. Thus, $K(y_c - y_d)$ is small whenever the second differences are small, as they are if the function is suitable for interpolation.

Therefore, if K is not exactly constant, the effect is that of a small percentage variation of a small quantity, and the resulting variation in the generated curve is negligible. The material presented in the previous paragraph also justifies the replacement of $$\frac{M}{R_2 + str_2 M}$$

in Equation 2c by the constant $1/R_2$ to obtain Equation 2d.

It will now be shown that equations exist which are outside of the Subgeneric from but which fit the Generic Equation. A relatively simple example is Species III which results when $R_1 = \infty$ and $r_0 = 0$. The constant $a$ becomes infinite, points $\alpha$ and $\beta$ are at infinity, and the line of interpolation $L_{III}$ for obtaining the value of $y_{cIII}$ is parallel to the $x$ axis. Thus, as $x$ varies from $x_1$ to $x_2$, the linear interpolative value $y_{cIII}$ will remain fixed at a value which from Equation 4 is seen to be $\tfrac{1}{2}(y_0 + y_3)$. In the apparatus (FIG. 2B), the voltage variation along $r_0$ is negligible and voltage $V_c$ will remain substantially fixed at $\tfrac{1}{2}(V_0 + V_3)$ as contact 40 moves along it. Therefore, there is no need for contact 40 to be movable.

The value $\tfrac{1}{2}(y_0 + y_3)$ is the same as the value of $y_c$ for Species I midway between $x_1$ and $x_2$. Therefore, if $K = \tfrac{1}{2}$ as in Species I, $y_{III}$ will coincide with $y_I$ at this midpoint and an appropriate value for K is $\tfrac{1}{2}$. Then, $y_{III} = y_d - \tfrac{1}{2}st(y_c - y_d)$ which fits the Generic Equation. Expressed in terms of known $y$ values, $$y_{III} = sy_2 + ty_1 - \frac{st}{2}[\tfrac{1}{2}(y_3 + y_0) - (sy_2 + ty_1)]$$

which defines $y$ when $x$ is between $x_1$ and $x_2$ inclusive. $y_{III}$ is identical to $y_I$ only if $y_0 = y_3$. Unless $y_0 = y_3$, $y_{III}$ does not fit the Subgeneric Equation.

Apparatus embodying the Species III equation will be simpler than apparatus embodying the Species I or II equations but in general will be less accurate. Species III apparatus will probably be most useful where the slope of the curve being generated changes at a relatively slow rate.

It was noted above that in all cases the value of $y_c$ is symmetrically dependent on the value of $y_0$ and $y_3$. In the Subgeneric cases other than Species I, the value of $y_c$ is also symmetrically dependent on the values of $y_1$ and $y_2$. This may not be true as to equations which do not satisfy the Subgeneric form, and is not true, for example, as to Species III.

The inventor believes that curves satisfying the Subgeneric Equation will probably prove to be the most generally useful curves in practice of the invention. However, no sharp boundaries can be defined for the form of curves which will be useful in the absence of restrictions on the size of $h$; the allowable variations of $y$ and its derivatives, in the curve generated, from the values of $y$ and its derivatives in the functions to be approximated; and the type of the latter functions. Generally, any system in which K is substantially constant and $y_c$ is to a major degree symmetrically dependent on the first and fourth $y$ values in a series, i.e. $y_0$ and $y_3$, is considered to fall within the ambit of the invention.

At one or more places in the above discussion, the term "substantially constant" has been used with respect to the quantity K. The Generic, Subgeneric, and Species equations are of true cubic form. However, from the above mathematical expressions involving K, it will be seen that in *apparatus* embodying the invention, the value of K may vary somewhat from a precise value and the curve generated by the apparatus will depart from a true cubic curve.

Generally speaking, in a given apparatus, K can vary through any range which will not result in an excessive variation of the value of $y$. For example, if the apparatus is required to provide only very rough or general approximations of a curve, the value of K can vary widely. For the purposes of the performance required of the apparatus, K is substantially constant. On the other hand, if the apparatus is required to approximate a curve with a high degree of accuracy, then K will have to be held within a small range of variation in order to meet the requirements of the apparatus and in this case only in that small range will K be "substantially constant." The above mathematical proofs demonstrate how K can be kept substantially constant.

In the apparatus disclosed, the Species I and III equations can be attained with negligible error. Species II cannot be approximated as closely as Species I in the disclosed apparatus since equality of $R_1$ and $R_0$ requires an infinite value for $r_0$; while on the other hand one of the general conditions for the apparatus is that $r_0$ must be small with respect to $R_2$. However, the Species II curve can be closely approximated as is brought out in the example given below.

Values for the resistances in the network illustrated can be chosen with some freedom, keeping in mind the conditions that (1) the resistances of resistors 20–24 are small with respect to other resistances in the circuit; (2) $R_2$ is large relative to $r_0$, $r_1$, and $r_2$; and (3) $R_3$ is large relative to $r_2$.

The effective resistance of the resistors 20–24 is essentially the resistance between their respective taps. Assuming 1K (1,000) ohm resistors with 8 taps, this effective resistance is 125 ohms. Suitable values for the other resistors in the various species are:

|  | Species I | Species II | Species III |
|---|---|---|---|
| $R_0$ | 10K | 4.762K | 10K |
| $R_1$ | ∞ | 5.0K | ∞ |
| $r_0$ | 10K | 100K | 0 |
| $r_1$ | 10K | 10K | 10K |
| $r_2$ | 1K | 5K | 1K |
| $R_2$ | 1 Meg | 5 Meg | 1 Meg |
| $R_3$ | 20K | 20.5K | 20K |
| $R_4$ | 10 Meg | 20 Meg | 10 Meg |

In the above example approximating Species II, a finite value has been chosen for $r_0$, instead of the ideal value of infinity. The ideal cannot be attained because $r_0$ must also be small relative to $R_2$. The values given correspond to a member of the Subgeneric class for which the constant $a$ is .0244. Thus, the line L will be shifted from $L_{II}$ toward $L_I$ by about 2½ percent. As was brought out above, the difference between $y_{II}$ and $y_I$ is very small. Consequently, 2½ percent of this difference is completely negligible, and the approximation to Species II is very good.

Apparatus

Illustrative values of the various resistances suitable for use in the apparatus about to be described are given in the preceding discussion and in the discussion under "Recapitulation and Correlation."

FIG. 3 shows diagrammatically a device for generating a single cubic curve segment between $y$ values $y_1$ and $y_2$. Resistors 20–23, 25, and a sixth resistor 24 are connected in parallel to a source of current such as battery B by wires 51–58 through segments 61–68 and brushes 69 and 70 of a commutator 72. The commutator brushes, along with battery B, are bodily carried by a carrier 74 having a threaded connection to an elongate screw 76. Carrier 74 also carries the $y$ contact 35. Screw 76 is operated by a servo motor 78 through a worm 80 on the motor shaft engaged with a worm wheel 82 on screw 76. The servo motor is actuated by the output from amplifier 44 connected into the circuitry between $y_d$ and $y_f$.

An important feature of the physical apparatus is that resistors 20–25 inclusive are endless or unbroken and are circuital. This is represented in FIG. 3 by the use of identical reference characters 58 to identify the top and bottom wires connecting the resistors in parallel. The reason for this structure is that, as pointed out above, the difference between the voltages at $y_0$–$y_3$ is the significant factor rather than the absolute values of the voltages. The location of zero voltage or zero $y$ value is immaterial. With this construction, there are no boundaries or stops which limit the setting of the $y$ contacts 30–33. The latitude of operation is thus very broad.

Reiterating now what was brought out above, the positions of the $y$ contacts 30–33 are analogs of the values of $y_0$–$y_3$ respectively. Therefore, the resistors 20–24 must have a length or circumferential extent adequate to span the maximum difference between the $y$ values $y_0$–$y_3$ etc., likely to be encountered in any one cycle of operation. Moreover, this length or circumferential extent must exist within a single arcuate segment defined by commutator brushes 69 and 70. In other words, the commutator brushes may not contact the commutator ring at points between the location of contacts 30–33. The number of commutator segments and corresponding number of taps on resistors 20–25 is a matter of choice. In a working model of the computer, it has been found convenient to use eight taps and commutator segments.

In FIG. 3, $r_0$ and $r_1$ are ordinary circular resistors of the type commonly referred to as potentiometers in the trade. $r_2$ is also in the form of a potentiometer except that in this case it is endless rather than broken since the voltage at both ends of the resistor is the same as will be apparent from FIG. 2B. The wipers 40, 41, and 42 of these resistors respectively are turned by a common shaft 86 driven by a motor 88. Rotation of shaft 86 represents the changing value of the independent variable $x$.

It will be assumed that initially contacts 30–33 have been set respectively at values $y_0$–$y_3$ and that the $y$ contact 35 is initially at a position analogous to the value of $y_1$; wipers 40–42 are at the starting points of their cycles as shown in dotted lines in FIG. 3. Upon rotation of $x$ shaft 86 and corresponding movement of wipers or contacts 40–42, unlike voltages will be created at $y_d$ and $y_f$, and these voltages are fed into amplifier 44. The amplifier amplifies the difference and feeds the amplified signal to servo motor 78 which, through worm 80 and wheel 82, rotates shaft 76 in the direction to move carrier 74 and contact 35 to a position at which the voltages at $y_d$ and $y_f$ are equal.

In the meantime, the $x$ shaft has continued to rotate, and a continually changing signal is fed into the amplifier causing $y$ contact 35 continually to seek a new position for balancing voltages at $y_f$ and $y_d$. This process continues until contacts 40 and 41 reach the ends of their respective resistances $r_0$ and $r_1$ and wiper 42 is close to its starting point. $y$ contact 35 is now at a position analogous to the value of $y_2$.

During this cycle of operation, the $x$ and $y$ coordinates represented respectively by the angular position of shaft 86 and the position of $y$ contact 35 have traced a curve between $y_1$ and $y_2$ which is a segment of a longer cubic curve satisfying the Generic Equation above and defined by one of the Species equations depending upon how the various resistances are chosen.

It is difficult to make resistances such as $r_0$ and $r_1$ which are so nearly identical that their wipers or contacts will break contact at precisely the same instant. From FIG. 2B, it will be apparent that as the curve-generating cycle approaches its end, $V_d$ or $y_d$ will be approaching the value $V_2$ or $y_2$. If wiper 41 should break contact with $r_1$ before wiper 40 breaks contact with $r_0$, the result would be a sudden large variation in the voltage $y_d$ or $V_d$ at one side of amplifier 44. This would cause a sudden jump in the position of $y$ contact 35. On the other hand, near the end of the cycle, if wiper 40 breaks contact first, the influence on voltage $V_f$ or $y_f$ is relatively small, and as a practical matter can be ignored. Therefore, the gap 90 between the ends of resistor $r_0$ is made slightly larger than the gap 91 between the ends of resistor $r_1$. The difference in the sizes of the gaps is shown in exaggerated form in FIG. 3.

To use the apparatus of FIG. 3 to generate another segment of a curve contiguous to the one just completed, the device would first be de-activated. Contact 30 would be adjusted to the $y_1$ position, contact 31 to the $y_2$ position, contact 32 to the $y_3$ position, and contact 33 to the next $y$ value $y_4$ in the series. Then the device would be re-actuated and the next curve segment generated.

However, this method of operation is inconvenient in generating a continuous curve. Therefore, a fifth resistor 24 and tap 34 are utilized in conjunction with a switching system which operates automatically at the end of each cycle to bring a new series of four successive values of $y$ into the circuit. For example, at the end of the first cycle, tap 30 will be disconnected from wire 92 and will be thus switched out of the circuit. Tap 31 will be switched from wire 93 to wire 92 while remaining at a position corresponding to the value of $y_1$.

Similarly, tap 32 will be switched to wire 93 and tap 33 will be switched to wire 94. Taps 32 and 33 retain their positions corresponding respectively to $y_2$ and $y_3$. Tap 34 is first set at a position corresponding to the value of $y_4$ and is then switched into connection with wire 95. After the cycle has been completed utilizing values $y_1$–$y_4$, the switching again occurs moving each of the taps one step to the left as FIG. 3 is viewed. This drops tap 31 out of the circuit and switches tap 30 back into the circuit at wire 95 with a new value $y_5$ (not shown). The cycling and switching continues until the curve to be generated is complete.

Figure 4:
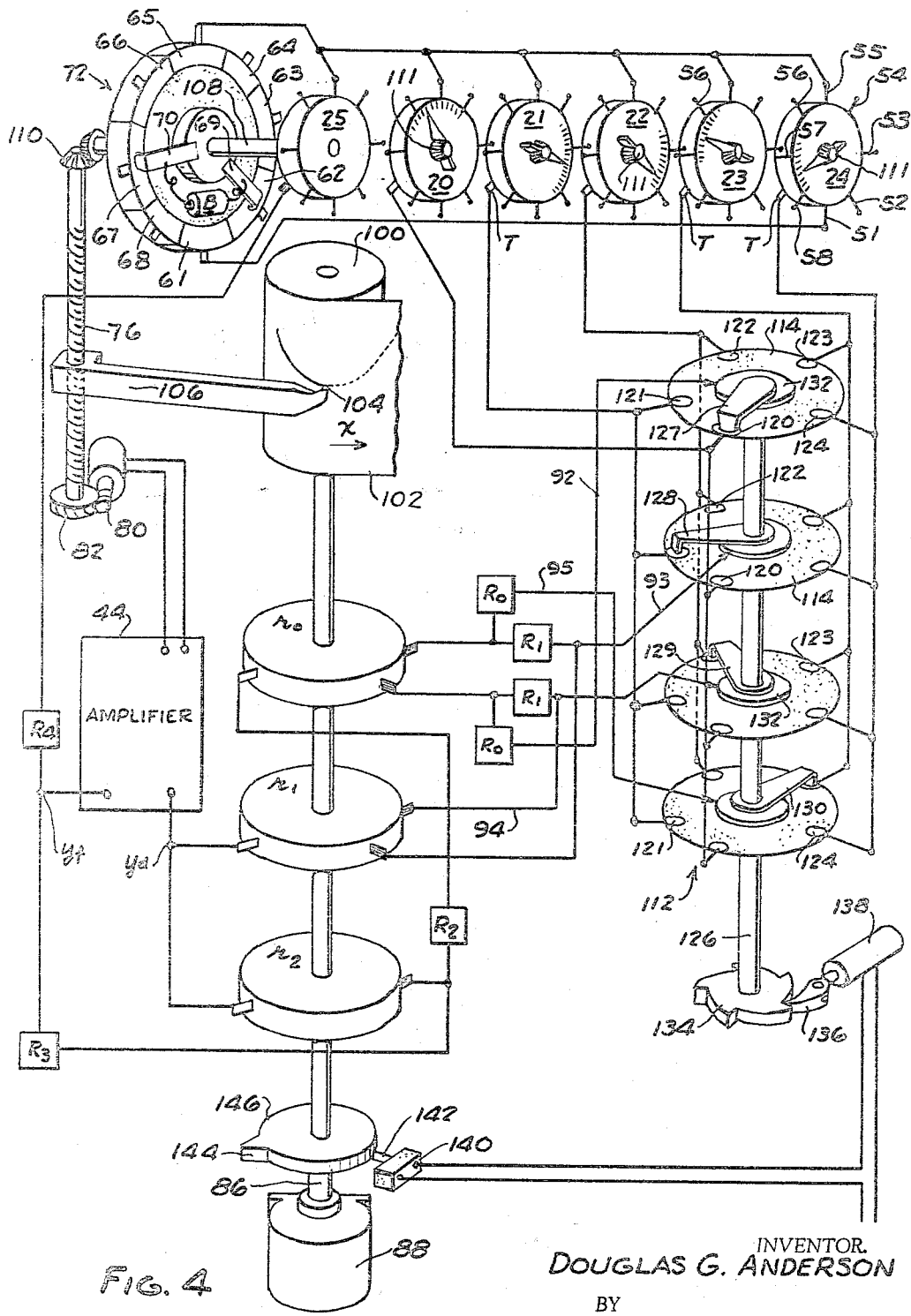
FIG. 4 is a generally diagrammatic view of apparatus capable of continual cyclic operation for generating a complete curve.

FIG. 4 is a schematic representation of a working model embodying the invention. In addition to the structure illustrated in FIG. 3, this apparatus includes a switch mechanism to facilitate continuous operation and includes means for physically tracing the curve being generated.

The curve tracing means includes a drum 100 secured on shaft 86. A sheet of paper 102 is secured to the drum. As the drum rotates, the paper is drawn from a suitable source (not shown) beneath a pen 104 supported by a holder 106 threadedly engaged with screw 76. Rotation of drum 100 represents the increasing value of the independent variable $x$ while movements of pen 104 represent corresponding variations in the dependent variable $y$. Thus, the pen traces on paper 102 the curve being generated.

The direction of rotation of motor 88 and shaft 86 in FIG. 4 is reversed to the direction of rotation in FIG. 3 so that in FIG. 4 the increasing value of $x$ will be from left to right, as in the other figures.

In FIG. 4, commutator 72 has a shaft 108 rotated by screw 76 through bevel gearing 110, and shaft 108 turns the wiper terminal 35 (not shown in FIG. 4) for the $y$ resistor or potentiometer 25.

Resistors or potentiometers 20–24, as shown in FIG. 4, are housed, and the housings have graduated faces to facilitate setting of contacts or wipers 30–34 (not shown in FIG. 4) by means of knobs 111 connected with the contacts. For the sake of clarity, the only tap wires for potentiometers 20–25 and commutator 72 shown in full in FIG. 4 are wires 51 and 55. The other tap wires 52–54 and 56–58 are represented merely as stubs radiating from the potentiometers and commutator. It will be understood that the stubs radiating from like angular positions of the potentiometers and commutator are interconnected by various tap wires to provide the circuitry represented in FIG. 3. Each potentiometer 20–24 has a fixed terminal T which connects its wiper to a switch bank 112. Potentiometers 25, $r_0$, $r_1$, and $r_2$ have fixed terminals shown in solid black connected into the circuitry as shown.

Switch bank 112 comprises four stationary discs 114 made of a non-conducting material, and each of these discs is provided with a series of contacts 120–124. These contacts are spaced at equal angular distances around the discs, and the like numbered contacts are longitudinally aligned with each other. Contacts 120 are connected in parallel to the fixed terminal for potentiometer 20. Similarly, contacts 121–124 are connected in parallel respectively with the fixed terminals of potentiometers 21–24.

A rotatable switching shaft 126 extends through discs 114 and carries four switching arms 127–130, one for each disc 114. These arms project at different angles from shaft 26 for making contact with the contacts on discs 114 at four successive rotative positions. Arms 127–130 rotate in electrical contact with rings 132 which are connected into the resistance network through wires 92–95.

Shaft 126 is rotated through one-fifth of a revolution at the end of each cycle of operation of the apparatus by such means as a five-tooth ratchet wheel 134 through a pawl 136 and a spring-returned solenoid 138. The solenoid is actuated by a switch 140 having a plunger 142 which is operated at the end of each cycle by a lug 144 on a cam 146 mounted on motor shaft 86.

In operation, it will be assumed that the operator has been provided with a table of $y$ values taken from the curve to be approximated and that he has set the adjusting knobs 111 of potentiometers 20–23 at four successive tabular values of $y$ ($y_0$–$y_3$ respectively). The correspondence between the settings illustrated and the positions of wipers 30–33 in FIG. 3 can be seen by the rotative positions of the pointers on knobs 111. Potentiometer 20 is set at a $y$ value of between 55 and 56.

Potentiometers 21 and 22 are set at slightly different values in the interval between 52 and 53, while potentiometer 23 is set at a value somewhat higher than 56.

Contact arms 127–130 are engaged respectively with contacts 120–123 so that potentiometers 20–23 are all in the circuit. Potentiometer 24, whose wiper terminal is connected to contacts 124, is out of the circuit since no contact arm in the switch bank is in engagement therewith. It will be assumed that lug 144 is positioned immediately clockwise of switch plunger 142 and that wipers 40, 41, and 42 of potentiometers $r_0$, $r_1$, and $r_2$ respectively are positioned at their starting points as represented in dotted lines in FIG. 3. When the circuit is energized and motor 88 set into operation, the apparatus generates a portion of a cubic curve between the points $x_1y_1$, $x_2y_2$ in the manner described above with respect to FIG. 3. However, in the apparatus of FIG. 4, pen 104 actually traces a physical manifestation of the curve on sheet 102.

While the apparatus is going through its first cycle of operation, the operator sets potentiometer 24 at the next tabular value of $y$, namely $y_4$, to condition the apparatus for its subsequent cycle of operation. As illustrated in FIGS. 3 and 4, $y_4$ may be in the interval between values 57 and 58.

At the end of the first cycle of opeartion, wipers 40 and 41 disconnect from their respective resistors $r_0$ and $r_1$ in the manner described above, and this temporarily removes potentiometers 20–23 from the circuit. At this time, lug 144 engages switch plunger 142 to operate switch 140 for energizing solenoid 138, which, through pawl 136, rotates ratchet wheel 134 and shaft 126 one-fifth of a revolution. This shifts contact arms 127–130 one step clockwise as FIG. 4 is viewed into contact with contacts 121–124 respectively. Wipers 40 and 41 then re-engage their respective resistors $r_0$ and $r_1$ at their starting points, and this connects potentiometers 21–24 into the circuit while potentiometer 20 is left out of the circuit. Lug 144 disengages switch plunger 142 so that spring returned solenoid 138 retracts pawl 136.

The apparatus then goes through another cycle of operation similar to that described above except that values $y_1$–$y_4$ are used and a segment of a cubic curve between the points $x_2y_2$ and $x_3y_3$ is generated. During this cycle, the operator sets the next tabular value of $y$, $y_5$ (not illustrated), in potentiometer 20. At the end of the second cycle, the described circuit-breaking, switching, and re-establishing of the circuit is accomplished in the manner described, and in the subsequent cycle, potentiometers 22, 23, 24, and 20 are in the circuit and potentiometer 21 is out of the circuit so that it can be set at the next succeeding tabular value of $y$, $y_6$ (not illustrated). This cycle of operation is continued until the curve to be generated is completed.

There is an interval of time between successive cycles of operation in which wipers 40 and 41 are in gaps 90 and 91 respectively so that all of the potentiometers 20–24 are out of the circuit and no signal is fed into amplifier 44. When the next cycle starts, wiper 41 is at the same voltage as it was when the preceding cycle ended. Thus, at the end of the first cycle, wiper 41 is at voltage $y_2$ and at the beginning of the next cycle wiper 41 is still at voltage $y_2$.

During the switching period, motor 88 and paper 102 continue to move. If, at the instant of switching, servo motor 78 and pen 104 are stationary, pen 104 will trace a very small straight horizontal line on paper 102 during the switching interval. If motor 78 is moving at the end of the cycle, inertia in the motor and screw 76 will carry pen 104 somewhat beyond the $y$ value at the end of the cycle. The latter condition results in a slight voltage difference at amplifier 44 at the beginning of a new cycle which is immediately corrected when the new cycle starts.

Gap 91 in resistor $r_1$ is very small, being less than one degree of arc. Gap 90 in resistor $r_0$ is just slightly greater as was brought out above. The switching is accomplished in a small fraction of a second so that the time interval between cycles is very small. Thus, the inaccuracy of the line traced by pen 104 in the interval between cycles is so small as to be insignificant.

In an actual working model of the apparatus, shaft 86 and potentiometers $r_0$, $r_1$, and $r_2$ are rotated at the rate of about one revolution per ten seconds. Thus, the apparatus completes one cycle about once every ten seconds. The operator sets knob 111 of that one of the potentiometers 20–24 which is out of the circuit at any one time while the machine is going through its cycle. This means that the only thing required of an operator is that he be provided with a table of $y$ values and that he manually set the operating knob of the potentiometer out of the circuit each time that the apparatus begins a new cycle. Thus, an unskilled operator can run the machine.

It will be understood that potentiometers 20–24 could be set successively by automatic means controlled by a programmed tape or the like. The tape could be very simple and relatively short because the cubic interpolation utilized by the apparatus facilitates generating a curve with only a relatively small number of $y$ values. For example, an elliptical curve can be generated with only about six $y$ values in each quadrant. From this, it will also be seen that such a curve would require only about four minutes of the computer's time and of the operator's time.

The apparatus overall is relatively inexpensive and light weight. With ordinary commercial miniaturization techniques, the apparatus of FIG. 4 can be compacted to the size of about half of an ordinary cigar box and will weigh in the neighborhood of six or seven pounds. With some of the more sophisticated miniaturization techniques presently coming into use, particularly military use, the apparatus can be further reduced in size and weight to a considerable extent.

If it should be desired to generate only a single predetermined curve or function, potentiometers 20–24 would not have to be adjustable to different values. Instead, a gang of fixed value resistances could be used with a switching mechanism modified from that shown at 112 in FIG. 4 to progressively connect successive groups of four of the fixed resistances into the circuit. Such a computer could be used to generate the same function repeatedly.

While the cyclic rate of the FIG. 4 apparatus is relatively slow, by the selection of suitable equipment, the cyclic rate could be increased many times. This is particularly true where, for example, the physical manifestation of the curve being generated, instead of being in the form of movement of a tool, pen 104, or the like, would be a line on the screen of an oscilloscope.

*Recapitulation and correlation*

The purpose of this section is to recapitulate briefly certain material presented above in the mathematical proof and correlate certain terms used in the claims with elements shown in the drawings.

It will be assumed that a group of four $y$ values $y_0$–$y_3$ is being used to generate a curve segment between $x_1y_1$ and $x_2y_2$. For convenience in claiming, the Generic Equation is put in the form $$y_p = y_d - \frac{K(x_p - x_1)(x_2 - x_p)}{(x_2 - x_1)^2}(y_c - y_d)$$

in which $x_p$ is any value of $x$ between $x_1$ and $x_2$ and $y_p$ is the corresponding $y$ value. These values are represented merely as $x$ and $y$ respectively in FIG. 2A.

$y_d$ is the value of $y$ lying on a straight line between points $x_1y_1$ and $x_2y_2$ and taken at $x_p$. $y_d$ is termed the linear interpolative value of $y$ at $x_p$ between $x_1y_1$ and $x_2y_2$ and is illustrated in FIG. 2A. The analogous voltage is determined by the position of wiper 41 on resistance $r_1$, FIGS. 2B and 3.

Similarly, $y_c$ is termed the linear interpolative value of $y$ at $x_p$ between two points $x_\alpha y_\alpha$ and $x_\beta y_\beta$, represented in FIG. 2A merely as $\alpha$ and $\beta$, sometimes subscripted. The analogous voltage is determined in general by the position of wiper 40 on resistance $r_0$.

The quantities $x_p - x_1$ and $x_2 - x_p$ have analogous resistances determined by the positions of wipers 40 and 41 on resistors $r_0$ and $r_1$ respectively. The correspondence between the $x$ values and wiper portions is apparent from a comparison of FIGS. 2A and 2B.

K is substantially a constant greater than zero whose value in the apparatus illustrated is $$K = \frac{R_4 r_2}{R_3 R_2}$$

This value will vary somewhat from a precise value. However, as is brought out in the mathematical proof, the amount of K's variation can be kept so small that it can be neglected. Therefore, K is referred to in the specification and claims as a constant or substantially a constant.

Three general conditions to proper functioning of the illustrated apparatus are (1) the resistances of resistors 20–24 are small with respect to the other resistances in the circuit; (2) $R_2$ is large relative to $r_0$, $r_1$, and $r_2$; and (3) $R_3$ is large relative to $r_2$.

In one species of the equation (Species I), $R_1$ is infinite and $K = \frac{1}{2}$. In this species, $R_0 = r_0$ since the value $y_d$ is obtained by linear interpolation between $x_0y_0$ and $x_3y_3$, also denoted $\alpha_I$ and $\beta_I$ in FIG. 2A. Moreover, the second derivative of the generated curve is continuous, making it particularly useful where, for example, the curve to be generated is involved with accelerations as in the case of cams. The first derivative is in general not continuous but the discontinuity is small and can be ignored in many situations even where continuity of the first derivative is important.

In another species, Species II, $R_0$ is very nearly equal to $R_1$, $R_0$ is small with respect to $r_0$ to obtain an accurate linear interpolative value of $y_c$ (specifically $y_{cII}$) between $\alpha_{II}$ and $\beta_{II}$, and $K = 1$. The curve generated by use of this species is also continuous and so is its first derivative. This may be the better form where continuity of the first derivative is important. The second derivative is in general not continuous.

Species I and II are the limiting cases of a Subgeneric form of the equation wherein certain conditions additional to those of the Generic Equation are imposed on K and $y_c$, these values be denoted in the Subgeneric form respectively as K' and $y_c'$. $y_c'$ is obtained by linear interpolation on line L' between points $\alpha'$ and $\beta'$, respectively lying on lines $x_0y_0$ to $x_2y_2$ and $x_3y_3$ to $x_1y_1$. Points $\alpha'$ and $\beta'$ divide their respective lines in the same ratio, measuring from $x_0y_0$ and $x_3y_3$ respectively. This ratio is denoted $R_0/R_1$ and is not greater than one. These conditions are fulfilled in the illustrated apparatus when $$r_0 = \frac{R_0 R_1}{R_1 - R_0}$$

and $$K' = \frac{1}{2}\left(1 + \frac{R_0}{R_1}\right)$$

Other species equations exist which are outside of the Subgeneric Equation, for example, Species III which results when $R_1 = \infty$ and $r = 0$. An appropriate value for K is $\frac{1}{2}$. The line of interpolation $L_{III}$ for obtaining $y_{cIII}$ is parallel to the $x$ axis and the interpolative value $y_{cIII}$ therefore remains at a fixed value, which is $\frac{1}{2}(y_0 + y_3)$, as $x$ varies from $x_1$ to $x_2$. In the apparatus, the voltage variation along $r_0$ is negligible and there is no need for contact 40 to be movable. Thus, apparatus embodying Species III is simpler than apparatus embodying Species I or II; but in general, Species III apparatus will be less accurate. Species III apparatus will probably be most useful where the slope of the curve being generated changes at a relatively slow rate.

Examples of resistance values suitable for use in the illustrated apparatus follow. For each species, it is assumed that a typical amplifier 44 having a resistance of 10K (10,000) ohms is used. Each potentiometer 20–24 has a resistance of 1K ohms, and the effective resistance between adjacent taps 51–58 of each is 125 ohms.

|       | Species I | Species II | Species III |
|-------|-----------|------------|-------------|
| $R_0$ | 10K       | 4.762K     | 10K.        |
| $R_1$ | ∞         | 5.0K       | ∞.          |
| $r_0$ | 10K       | 100K       | 0.          |
| $r_1$ | 10K       | 10K        | 10K.        |
| $r_2$ | 1K        | 5K         | 1K.         |
| $R_2$ | 1 Meg     | 5 Meg      | 1 Meg.      |
| $R_3$ | 20K       | 20.5K      | 20K.        |
| $R_4$ | 10 Meg    | 20 Meg     | 10 Meg.     |

As is brought out in detail in the mathematical proof, the circuit parameters can vary widely without appreciably altering the curve traced by the point $x_p y_p$.

In all forms of the equation, the values of $x$ at points $\alpha$ and $\beta$ are $$x_\alpha = x_1 - ah \text{ and } x_\beta = x_2 + ah$$

The values of $x_\alpha$ and $x_\beta$ differ equally but with opposite sign from the value of $x$ midway between $x_1$ and $x_2$. Also, the value of $y_\alpha$ depends on the value of $y_0$ in the same way that the value of $y_\beta$ depends on the value of $y_3$. Therefore, the value of $y_c$ is symmetrically dependent on the values of $y_0$ and $y_3$. In equations satisfying the Subgeneric form other than Species I, the value of $y_c$ is also symmetrically dependent on the values of $y_1$ and $y_2$. This may not be true as to equations which do not satisfy the Subgeneric Equation and is not true, for example, as to Species III wherein $a = \infty$.

The inventor believes that curves satisfying the Subgeneric Equation will probably prove to be the most generally useful curves in practice of the invention. However, no sharp boundaries can be defined for the form of curves which will be useful in the absence of restrictions on the size of the interval between values of $x$; the allowable variations of $y$ and its derivatives, in the curve generated, from the values of $y$ and its derivatives in the functions to be approximated, and the type of the latter functions. Generally, any system in which K is substantially constant and $y_c$ is to a major degree symmetrically dependent on the first and fourth $y$ values in a series, i.e. $y_0$ and $y_3$, is considered to fall within the ambit of the invention.

I claim:
1. A function generator comprising,
   means operable to provide analogs of the relative values of the $x$ and $y$ coordinates of four points $x_0 y_0$, $x_1 y_1$, $x_2 y_2$, and $x_3 y_3$ known to lie on a function,
   means operable to vary the analog of the value of $x$ from $x_1$ to $x_2$,
   and means operable to vary the analog of the value of $y$ from $y_1$ to $y_2$ in accordance with a cubic equation responsive to said variation of the $x$ analog from $x_1$ to $x_2$,
   the latter-said means including:
      means operable to provide an analog of the linear interpolative value of $y$, namely $y_d$, between $x_1 y_1$ and $x_2 y_2$ at any value of $x$, namely $x_p$, intermediate $x_1$ and $x_2$,
      means operable to provide an analog of the linear interpolative value of $y$, namely $y_c$, at $x_p$, between two points selected so that the value of $y_c$ is symmetrically dependent on the values of $y_0$ and $y_3$,
      means operable to provide at $x_p$ an analog of the difference between the values $y_c$ and $y_d$,
      means operable to provide analogs of the quantities $x_p - x_1$, $x_2 - x_p$, and $x_2 - x_1$,
      and means operable to interrelate the analogs of said values and quantities at $x_p$ in accordance with the expression

$$y_d - \frac{K(x_p - x_1)(x_2 - x_p)}{(x_2 - x_1)^2}(y_c - y_d)$$

wherein K is a constant greater than zero,
      and means operable responsive to change in the value of said expression to equate the value of $y$ to the value of said expression at $x_p$.

2. In combination with the function generator defined in claim 1, means operable responsive to variations of said variables to provide a physical manifestation of the curve generated at $x_p y_p$ wherein $y_p$ is said equated value of $y$.

3. The combination defined in claim 2 wherein said operable means comprises,
   means operative to provide a physical manifestation of the varying value of the analog of $x$,
   means operable to detect differences in the two quantities represented by the value of $y$ and the value of said expression at $x_p$ caused by variations in the value of $x$, and to provide a physical signal indicating said differences,
   means operable under the influence of said signal to vary $y$ toward $y_p$, and means operable responsive to operation of the latter-said means to provide a physical manifestation of the variations of $y$.

4. The function generator defined in claim 1 wherein said interrelating means includes an electrical resistance network in which $y$, $y_d$, and $y_c$ comprise voltages; and $$\frac{x_p - x_1}{x_2 - x_1} \text{ and } \frac{x_2 - x_p}{x_2 - x_1}$$

comprise ratios between resistances.

5. The function generator defined in claim 1 wherein said means operable to provide said analog of $y_c$ is effective to provide the same on a line of interpolation between two points so selected that the value of $y_c$ is symmetrically dependent also on the values of $y_1$ and $y_2$.

6. The function generator defined in claim 5 wherein the line of interpolation of said means operable to provide said analog of $y_c$ is between $x_0 y_0$ and $x_3 y_3$, and $K = \frac{1}{2}$.

7. The function generator defined in claim 5 wherein one of said two points is midway between $x_0 y_0$ and $x_2 y_2$ the other of said two points is midway between $x_1 y_1$ and $x_3 y_3$, and $K = 1$.

8. The function generator defined in claim 1 wherein, of the values $y_0$, $y_1$, $y_2$ and $y_3$, said means operable to provide said analog of $y_c$ is effective to provide the same on a line of interpolation between two points so selected that the value of $y_c$ is symmetrically dependent only on the values of $y_0$ and $y_3$.

9. The function generator defined in claim 1 wherein the line of interpolation of said means operable to provide said analog of $y_c$ is parallel to the direction of the $x$ coordinate.

10. Apparatus for generating a function between two points $x_1 y_1$ and $x_2 y_2$ which are in a series of points $x_0 y_0$, $x_1 y_1$, $x_2 y_2$, $x_3 y_3$ known to lie on the function, $x$ being an independent variable, the differences between successive values of $x$, namely $x_0$, $x_1$, $x_2$, and $x_3$, being uniform, said apparatus comprising,
   means forming at least four endless circuital devices each of which is effective to present analog values of $y$ spanning at least the values from $y_0$ to $y_3$, means operative to establish a setting relative to the circuit of each device, said settings providing analogs of the relative values of $y_0$, $y_1$, $y_2$, and $y_3$, means operable to provide an analog of the varying value of $x$ between the values $x_1$ and $x_2$, means including two of said devices operable to provide an analog of the linear interpolative value of $y$, namely $y_d$, between $x_1y_1$ *and* $x_2y_2$ at any value of $x$ namely $x_p$, intermediate $x_1$ and $x_2$, means including the other two of said devices operable to provide at $x_p$ an analog of a value of $y$, namely $y_c$, which is symmetrically dependent on the values of $y_0$ and $y_3$, means operable to provide at $x_p$ an analog of the difference between the values of $y_c$ and $y_d$, means operable to provide analogs of the quantities $x_p-x_1$, $x_2-x_p$ and $x_2-x_1$, means operable to interrelate said analogs of said values and quantities in accordance with the expression $$y_d - \frac{K(x_p-x_1)(x_2-x_p)}{(x_2-x_1)^2}(y_c-y_d)$$

wherein K is a constant greater than zero, and means operable responsive to change in the value of said expression to equate the value of $y$ to the value of said expression at $x_p$.

11. The apparatus defined in claim 10 wherein said means operable to provide said analog of $y_c$ includes all four of said devices.

12. The apparatus defined in claim 10 wherein said means operable to provide said analog of $y_c$ includes, of said four devices, only said other two devices.

13. The apparatus defined in claim 10 and including, in addition, a fifth endless circuital device, said fifth device having continuously variable settings which provide analogs of the value of $y$, and means operable responsive to change in the value of said expression to vary the setting of said fifth device for substantially equating the value of $y$ to the value of said expression at $x_p$.

14. The apparatus defined in claim 13 wherein each of said five devices comprises an electrical resistor, said resistors being connected in parallel with a source of electric current, said analogs of said values of $y$, $y_0$, $y_1$, $y_2$, and $y_3$ being voltages, said fifth device having a wiper operatively connected with the last said means at which the voltage is an analog of said value of $y$ at $x_p$.

15. Apparatus for generating a function between two points $x_1y_1$ and $x_2y_2$ which are in a series of points $x_0y_0$, $x_1y_1$, $x_2y_2$, $x_3y_3$ known to lie on the function, $x$ being an independent variable, the differences between successive values of $x$, namely $x_0$, $x_1$, $x_2$, and $x_3$, being uniform, said apparatus comprising, at least four continuous circuital electrical resistors each of whose resistance per unit of length is substantially uniform, means operable to introduce electric current into said resistors, each resistor being provided with a wiper which can be set selectively at different positions thereon corresponding to different values of $y$, whereby to conduct current from the resistor at different voltages, the voltages from said resistors, when said wipers are appropriately set, providing analogs of the relative values of $y_0$, $y_1$, $y_2$, and $y_3$, means operable to provide an analog of the varying value of $x$ between the values of $x_1$ and $x_2$, means including two of said resistors operable to provide a voltage analog of the linear interpolative value of $y$, *namely* $y_d$, between $x_1y_1$ and $x_2y_2$ at any value of $x$, namely $x_p$, intermediate $x_1$ and $x_2$, means including the other two of said resistors operable to provide at $x_p$ a voltage analog of a value of $y$, namely $y_c$, which is symmetrically dependent on the values of $y_0$ and $y_3$, means operable to provide at $x_p$ a voltage analog of the difference between the values of $y_c$ and $y_d$, means operable to provide resistance analogs of the quantities $x_p-x_1$, $x_2-x_p$ and $x_2-x_1$, means operable to interrelate said analogs of said values and quantities in accordance with the expression $$y_d - \frac{K(x_p-x_1)(x_2-x_p)}{(x_2-x_1)^2}(y_c-y_d)$$

wherein K is a constant greater than zero, and means operable responsive to change in the value of said expression to equate the value of $y$ to the value of said expression at $x_p$.

16. The apparatus defined in claim 15 wherein said means operable to provide the analog of $y_d$ includes a first variable resistor between two of said endless resistors, said means operable to provide the analog of $y_c$ including a second variable resistor between the other two of said endless resistors, said interrelating means including a third variable resistor, said variable resistors having wipers which traverse the same responsive to operation of said means varying said analog of $x$ between $x_1$ and $x_2$.

17. The apparatus defined in claim 16 wherein said variable resistors are varied by rotating motor means whose rotation provides said varying $x$ analog.

18. A function generator comprising, means operable to provide analogs of the relative values of the $x$ and $y$ coordinates of a series of points $x_0y_0$, $x_1y_1$, $x_2y_2$, $x_3y_3$, . . . $x_ny_n$ known to lie on a function, $n$ being a number greater than 3, the difference between successive values of $x$ in the series being uniform, means operable to vary the analog of the value of $x$ from $x_1$ to $x_{n-1}$, selecting means operable to select the analog of successive groups of four $y$ values in said series, e.g. $y_0$ to $y_3$ and $y_1$ to $y_4$, means operable cyclically to vary the analog of the value of $y$ from the second to the third subscripted value in the selected group responsive to said variation of the value of the $x$ analog between like subscripted values in the selected groups, the latter-said means comprising:

means operable to provide an analog of the linear interpolative value of $y$, namely $y_d$, between said second and third subscripted values of $y$ at any value of $x$, namely $x_p$, intermediate said second and third subscripted values of $x$, means operable to provide an analog of a value of $y$, namely $y_c$, at $x_p$, which is symmetrically dependent on the first and fourth subscripted values of $y$, means operable to provide at $x_p$ an analog of the difference between the values of $y_c$ and $y_d$, means operable to provide analogs of the following quantities: $x_p$ minus the second subscripted value of $x$ in the selected group; the third subscripted value of $x$ in the selected group minus $x_p$; and the difference between the second and third subscripted value of $x$, means operable to interrelate said analogs of said values and quantities at $x_p$ in accordance with the expression $$y_d - \frac{K(x_p-x_1)(x_2-x_p)}{(x_2-x_1)^2}(y_c-y_d)$$

wherein K is a constant greater than zero and wherein $x_1$ and $x_2$ are said second and third subscripted values of $x$, and means operable responsive to change in the value of said expression to equate the value of $y$ to the value of said expression at $x_p$;

means operable upon termination of a cycle by said cyclically operable means to actuate said selecting means for selection of the succeeding group of $y$ values in said series, and means operable to interconnect the curves generated during said cycles as $x$ is varied from $x_1$ to $x_{n-1}$, whereby to approximate the function on which said points lie.

19. Apparatus for generating a function passing through points $x_1y_1$, $x_2y_2$ ... $x_{n-1}$, $y_{n-1}$ in a series of points $x_0y_0$, $x_1y_1$, ... $x_ny_n$ known to lie on the function, $n$ being a number greater than 3, $x$ being an independent variable, the differences between successive values of $x$ in the series being uniform, said apparatus comprising, means operable to provide an analog of the varying value of $x$ between the values $x_1$ and $x_{n-1}$, an electrical resistance network, at least five endless circuital electrical resistors connected to a source of electric current and whose resistances are substantially uniform per unit of length, each resistor having a wiper which can be set selectively at different positions corresponding to different relative values of $y$, whereby to conduct current from said resistor at a voltage providing an analog of a selected $y$ value, switch means selectively operable to connect successive groups of four of said resistors into said network, whereby to introduce into said network voltages which are analogs of the relative $y$ values of the selected group, e.g., $y_0$ to $y_3$ and $y_1$ to $y_4$, first interpolating means including first variable resistance means in said network and being operable to provide an analog of the linear interpolative value of $y$, namely $y_d$, between the second and third $y$ values of the selected group at any value of $x$, namely $x_p$, intermediate the second and third $x$ values of the selected group of points, second interpolating means including second variable resistance means in said network and being operable to provide an analog of a value of $y$, namely $y_c$, at $x_p$, which is symmetrically dependent on the first and fourth $y$ values of the selected group, means operable to provide analogs of the following three quantities: $x_p$ minus the second $x$ value of the selected group; the third $x$ value of said group minus $x_p$; and the difference between the second and third values of $x$, means operable to interrelate said analogs of said values and quantities at $x_p$ in accordance with the expression $$y_d - \frac{K(x_p - x_1)(x_2 - x_p)}{(x_2 - x_1)^2}(y_c - y_d)$$

wherein K is a constant greater than zero and wherein $x_1$ and $x_2$ are said second and third values of $x$, equating means operable responsive to change in the value of said expression to equate the value of $y$ to the value of said expression at $x_p$, means operable to actuate said switch means upon attainment by said $x$ analog of the third $x$ value of the selected group, said switch means being operable upon actuation to disconnect from said network the four resistors set at given $y$ values, e.g. $y_0$ to $y_3$, and to connect into said network at like points respectively the four resistors set at the succeeding group of values, e.g. $y_1$ to $y_4$, and means operable to interconnect the curves generated during the cycles between actuations of said switch means, whereby to approximate the function on which said points lie.

20. The apparatus defined in claim 19 wherein said electrical resistance network includes another endless circuital electrical resistor whose resistance is substantially uniform per unit of length, said other resistor having a wiper variable to different positions corresponding to different values of $y$, whereby to conduct current from said other resistor at voltages providing analogs of different values of $y$, said equating means being operable to vary the latter-said wiper to positions at which the latter-said $y$ analog voltage substantially equals said cubic interpolative value of $y$.

21. The apparatus defined in claim 20 wherein said resistors have an equal number of peripherally spaced taps connected in parallel with an equal number of commutator segments, the commutator having a shaft carrying brushes through which current is introduced into said segments and resistors, said brushes contacting segments which are sufficiently peripherally spaced to span the settings of four of said resistors for any likely maximum difference between the first and fourth $y$ value of a selected group.

22. The apparatus defined in claim 21 wherein said equating means includes said commutator shaft, said wiper of said other resistor being variable responsive to turning of said shaft.

23. The apparatus defined in claim 19 wherein said first variable resistance means comprises a first resistance connected between the second and third of the four continuous resistors switched into said network, said second variable resistance means comprising a second resistance connected between the first and fourth of the continuous resistors switched into said network, said inter-relating means including a third variable resistance electrically connected with said first and second resistances, said three variable resistances having wipers which traverse the same responsive to variation of said $x$ analog between the second and third values of the selected group, said first and second variable resistances having ends and said third variable resistance being circuital and endless, said first and second variable resistances being constructed and arranged so that the wiper of said second variable resistance is electrically disconnected while the wiper of the first variable resistance transfers from its one end to its other end during switching at the end of each curve-generating cycle.

24. Apparatus for generating a function passing through points $x_1y_1$, $x_2y_2$, ... $x_{n-1}$, in a series of points $x_0y_0$, $x_1y_1$, ... $x_ny_n$ known to lie on the function, $n$ being a number greater than three, $x$ being an independent variable, the differences between successive values of $x$ in the series being uniform, said apparatus comprising, means including motor means which is rotatable to provide an analog of the varying value of $x$ between the values $x_1$ and $x_{n-1}$, an electrical resistance network, at least six circuital electrical resistors whose resistances are substantially uniform per unit of length, said resistors being connected in parallel through an equal number of peripherally spaced taps which are also connected with an equal number of segments of a commutator having a shaft carrying brushes through which current is introduced into said segments and resistors, at least five of said resistors having a wiper which can be set selectively at different positions corresponding to different relative values of $y$ whereby to conduct current from said resistor at a voltage providing an analog of a selected $y$ value, said brushes contacting segments which are sufficiently peripherally spaced to span the settings of four of said resistors for any likely maximum differences between the first and fourth $y$ value of a select group, switch means operable selectively to connect successive groups of four of said resistors into said network, first, second and third variable resistances, each having a wiper which traverses the same responsive to rotation of said motor means through an interval between successive $x$ values, said first resistance being connected between the second and third of the four continuous resistors switched into said network, said second resistance being connected between the first and fourth of the continuous resistors switched into said network, said second and third variable resistance being electrically interconnected through a relatively high resistance, said first and third variable resistances being electrically connected through a relatively low resistance, means including said first resistance operable to provide a voltage analog of the linear interpolative value of $y$, namely $y_d$ between the second and third $y$ values of a selected group at any value of $x$, namely $x_p$ intermediate $x_1$ and $x_2$, means including said second resistance operable to provide at $x_p$ a voltage analog of a value of $y$, namely $y_c$ which is symmetrically dependent on the first and fourth $y$ values of a selected group means including said first resistance operable to provide resistance analogs of the following three quantities: $x_p$ minus the second value of $x$ of a selected group; the third $x$ value of the group minus $x_p$; and the difference between the second and third values of $x$, interrelating means including said third resistance operable to interrelate said analogs of said values in accordance with an expression providing between the second and third $x$ values of a group a cubic interpolative value of $y$, namely $$y_d - \frac{K(x_p - x_1)(x_2 - x_p)}{(x_2 - x_1)^2}(y_c - y_d)$$

wherein $K$ is a constant greater than zero and $x_1$ and $x_2$ are said second and third values of $x$, means including the wiper of the sixth circuital resistor operable to equate the value of $y$ at points between the second and third values of $x$ to the value of said expression, means operable to actuate said switch means upon attainment by said $x$ analog of the third $x$ value of the selected group, said switch means being operable upon actuation to switch into said network in substitution for one group of four resistors a second group of four resistors set at the succeeding group of $y$ values, and means operable to interconnect the curves generated during the cycles between actuations of said switch means whereby to approximate the function on which said points lie.

References Cited by the Examiner

UNITED STATES PATENTS

| | | | |
|---|---|---|---|
| 2,545,123 | 3/1951 | Tolson. | |
| 2,817,478 | 12/1957 | Newell | 235—197 |
| 2,886,244 | 5/1959 | Hunt | 235—197 |
| 3,011,132 | 12/1961 | Hinrichs et al. | 323—79 X |
| 3,063,637 | 11/1962 | Burhans | 235—197 X |
| 3,086,166 | 4/1963 | Salvatori | 235—197 X |
| 3,179,868 | 4/1965 | Schaefer | 235—197 X |

MALCOLM A. MORRISON, *Primary Examiner.*

I. KESCHNER, *Assistant Examiner.*